United States Patent [19]

Sieber

[11] Patent Number: 5,649,216

[45] Date of Patent: Jul. 15, 1997

[54] METHOD AND APPARATUS FOR AUTOMATED LAYOUT OF TEXT AND GRAPHIC ELEMENTS

[75] Inventor: Jonathan D. Sieber, Wayland, Mass.

[73] Assignee: Joseph S. Sieber, Weston, Mass.; a part interest

[21] Appl. No.: 658,976

[22] Filed: Jun. 4, 1996

Related U.S. Application Data

[63] Continuation of Ser. No. 504,691, Jul. 20, 1995, abandoned, which is a continuation of Ser. No. 62,463, May 14, 1993, abandoned, which is a continuation-in-part of Ser. No. 702,052, May 17, 1991, abandoned.

[51] Int. Cl.[6] ............................................. G06F 3/14
[52] U.S. Cl. ................................. 395/767; 395/768
[58] Field of Search ............................. 395/135, 145, 395/146, 147, 149, 155, 161

[56] References Cited

U.S. PATENT DOCUMENTS

| | | | |
|---|---|---|---|
| 4,454,576 | 6/1984 | McInroy et al. | 395/145 |
| 4,484,826 | 11/1984 | Horn et al. | 400/279 |
| 4,723,209 | 2/1988 | Hernandez et al. | 395/147 |
| 4,799,172 | 1/1989 | Wood et al. | 395/151 |
| 4,800,510 | 1/1989 | Vinberg et al. | 395/140 |
| 4,881,197 | 11/1989 | Fischer | 395/148 X |
| 4,951,233 | 8/1990 | Fujiwara et al. | 395/147 X |
| 5,003,499 | 3/1991 | Fujiwara et al. | 395/146 |
| 5,031,121 | 7/1991 | Iwai et al. | 395/147 |
| 5,050,091 | 9/1991 | Rubin | 364/488 |
| 5,051,930 | 9/1991 | Kuwabara et al. | 395/148 X |
| 5,144,693 | 9/1992 | Morgan | 395/158 |
| 5,148,520 | 9/1992 | Morgan | 395/148 |
| 5,208,906 | 5/1993 | Morgan | 395/148 |
| 5,241,464 | 8/1993 | Greulich et al. | 395/145 |
| 5,293,475 | 3/1994 | Hennigan et al. | 395/148 |

FOREIGN PATENT DOCUMENTS

| | | |
|---|---|---|
| 0075734A2 | 6/1983 | European Pat. Off. . |
| 0285449A2 | 5/1988 | European Pat. Off. . |
| 0376420 | 12/1989 | European Pat. Off. . |

OTHER PUBLICATIONS

Variable Object Space in Mixed Object Document Content Architecture, Jul. 1987, pp. 904–909, IBM Technical Disclosure Bulletin, vol. 30, No. 2.

Computers & Graphics (Gruber W:'Structures of an Integrated Document Workstation'), vol. 11, No. 4, 1987, Oxford GB pp. 377–387.

*Primary Examiner*—Heather R. Herndon
*Assistant Examiner*—Cliff N. Vo
*Attorney, Agent, or Firm*—Wolf, Greenfield & Sacks, P.C.

[57] ABSTRACT

A method for automated layout of text elements and artwork on a greeting card. A system for automatically carrying out the method for generating the layout of text elements and artwork on a greeting card includes a memory device for storing a plurality of artwork specifications, each artwork specification including information describing a piece of artwork and a plurality of constraints describing the layout of text elements in relation to the piece of artwork. The system further includes an input device for selecting one of the artwork specifications in the memory and a device for selecting the text elements of the greeting card. A processor, coupled to the memory device and the input device selectively manipulates the text elements and the artwork specification to generate a greeting card layout in accordance with the plurality of constraints of the selected artwork specification. An output device, either a video display or printer, is provided to display the generated greeting card layout.

67 Claims, 7 Drawing Sheets

PAGE SPECIFICATION

| PAGE DESCRIPTOR | PD1 |
|---|---|
| PAGE DESCRIPTOR | PD2 |

| DS1 | CHARACTER STRING | FONT | SIZE | PLACEMENT |
|---|---|---|---|---|
| DS2 | | | | |
| DS3 | | | | |
| DS4 | | | | |
| ⋮ | ⋮ | ⋮ | ⋮ | ⋮ |
| DS6 | | | | |

| CONSTRAINT 1 | C1 |
|---|---|
| CONSTRAINT 2 | C2 |
| CONSTRAINT 3 | C3 |

| GD1 | GRAPHIC DATA | LOCATION |
|---|---|---|

FIG. 3

ARTWORK SPECIFICATION

| D1 | CARD DESCRIPTOR |
|---|---|
| D2 | CARD DESCRIPTOR |

| AS1 | ARTWORK 1 DATA | SIZE | LOCATION |
|---|---|---|---|
| AS2 | ARTWORK 2 DATA | SIZE | LOCATION |
| ⋮ | ⋮ | ⋮ | ⋮ |
| An | ARTWORK n DATA | SIZE | LOCATION |

| C1 | CONSTRAINT 1 |
|---|---|
| C2 | CONSTRAINT 2 |
| C3 | CONSTRAINT 3 |
| ⋮ | ⋮ |
| Cn | CONSTRAINT n |

| DS1 | CHARACTER STRING | FONT | SIZE | PLACEMENT |
|---|---|---|---|---|
|  |  |  |  |  |

FIG. 7

METHOD AND APPARATUS FOR AUTOMATED LAYOUT OF TEXT AND GRAPHIC ELEMENTS

CROSS-REFERENCE TO RELATED APPLICATIONS

This application is a continuation of application Ser. No. 08/504,691, filed Jul. 20, 1995, now abandoned, which in turn in a continuation of application Ser. No. 08/062,463, filed May 14, 1993, now abandoned, which in turn is a continuation-in-part of application Ser. No. 07/702,052, filed May 17, 1991, now abandoned.

FIELD OF THE INVENTION

This invention relates to electronic publishing, and more particularly, to a system for automatically generating the page layout of a printed document from user-defined text and graphic elements. The invention also relates to a system for automatically generating the layout of a greeting card using a database of stored artwork and a database of stored message texts or text composed at the time of greeting card production.

BACKGROUND OF THE INVENTION

The design of printed material, i.e., the page layout, has historically been closely tied to the available page production technology. As publishing technology has evolved from early metal type technology to digitally scaled type technology, electronic publishing tools have likewise evolved. Early electronic publishing tools, such as TROFF by Bell Laboratories, Murray Hill, N.J., were designed to accommodate a page model of metal type which was laid out, from beginning to end, in a single process. These early publishing tools, required the user to embed descriptions of the page layout in the document itself. The embedded descriptions were later interpreted by a formatting program in a batch-oriented manner. That is, the layout process occurred without human interaction.

More recent interactive programs such as INTERLEAF by Interleaf Publishing, Inc., Cambridge, Mass., allow the user to see the page layout in real time as it is being edited. Such programs are particularly suited for arranging the page layout of running text, and include facilities for breaking up lines, columns and pages of text. The parameters available to the user to design the page layout typically control word hyphenation, line length, formatting of page headers, footers and margins, formatting of text into columns, and flow of text around graphics. Further, once a page layout is defined by the user, these programs allow a multipage document to be created with a consistent look throughout all pages. Although such publishing tools are appropriate for formatting running text, they are less well-suited for applications in which a number of graphical and text elements must relate to each other in complex ways. For this reason, page layout for ads and many other graphically oriented documents were still done by a graphic designer using hand paste-ups.

Still more recently, graphics-oriented publishing tools such as PAGE MAKER by Aldus, Corp. Seattle, Wash., and COREL DRAW by Corel System, Corp., Ottawa, Canada have combined interactive text formatting with graphics editing commands to give the user the ability to interactively place individual text or graphical objects anywhere on a page to effect an electronic paste-up of a page. With these newer tools, the designer is given much creative freedom, and interactively makes numerous changes to the page layout, typically on a trial and error basis, until the desired page layout is achieved. These tools are most suited for one-of-a-kind page layouts in which the choice of type and positioning of graphics and lettering is critical.

In documents such as greeting cards, business stationery, letterhead, business cards, resumes, restaurant menus, wedding invitations, and printed advertisements, the text and graphic elements are arranged in complex relationships. Unfortunately, none of the above-described publishing tools is capable of capturing these complex relationships. The text oriented publishing tools are too structured to achieve the desired document formats while the graphics-oriented publishing tools, require the designer to execute countless revisions of the page layout before achieving the desired format.

There exists a need for an electronic publishing tool which simplifies the design of documents which contain both text and graphic elements and which is capable of capturing the complex relationship between these elements.

Accordingly, it is an object of the present invention to provide a system which automates the page layout of graphic and text elements in a printed document.

Another object of the present invention is to provide a system which stores a plurality of page specifications, each page specification comprising a plurality of constraints describing the layout of user-definable text and graphic elements.

A further object of the present invention is to provide a system which allows the user to select a page specification, define text and graphic elements, and then automatically generate a page layout in accordance with the page specification through selective manipulation of the text and graphic elements.

Another object of the present invention is to provide a system which automates the page layout process, frees the designer from executing numerous revisions of the page layout to reach the desired format.

Yet another object of the present invention is to provide a method by which text and graphic elements in a page layout are automatically arranged in accordance with a plurality of constraints of a selected page specification.

A further object of the present invention is to provide a method for automating the layout of text and graphic elements on a page which frees the designer from executing numerous revisions of the page layout until the desired format is achieved.

Another object of the present invention is to provide a system that allows the user to select a piece of artwork from a database of artwork and to select a message text from a database of stored message texts or use text composed at the time of greeting card production, and then automatically generate a greeting card layout in accordance with the artwork specification through selective manipulation or the text and artwork.

Another object of the present invention is to provide a system which stores a plurality of artwork specifications, each artwork specification comprising information describing a piece of artwork and a plurality of constraints describing the layout of text elements in relation to the piece of artwork.

SUMMARY OF THE INVENTION

The above and other objects are achieved in accordance with the present invention which, according to a first aspect, provides an apparatus for automatically generating a layout of a plurality of text elements and graphic elements on a page. The apparatus comprises means for storing a plurality of page specifications, each page specification comprising a plurality of constraints describing the layout of user-definable text elements and graphic elements on a paper. Means are provided for selecting one of the page specifications as well as for receiving and storing user-defined character strings and graphic data defining the text elements and graphic elements, respectively, of the selected page specification. The apparatus further comprises means for manipulating the text and graphic elements of the selected page specification to automatically generate a page layout in accordance with the constraints of the selected page specification. Finally, the apparatus includes means for displaying the generated page layout.

In accordance with a second aspect of the present invention, a method is provided for automated layout of text and graphic elements on a page. Such method comprises the steps of establishing a plurality of page specifications, each containing a plurality of constraints describing the layout of user definable text and graphic elements, selecting one of the page specifications, defining the text and graphic elements, arranging the text and graphic elements into a page layout automatically in accordance with the constraints of the selected page specification, and displaying the arranged page layout.

In another embodiment of the present invention, an apparatus for automatically generating a layout of text elements and artwork on a greeting card is provided. The apparatus comprises memory means for storing a plurality of artwork specifications, each artwork specification comprising information describing a piece of artwork and a plurality of constraints describing the layout of other elements, such as text or other graphic elements, in relation to the piece of artwork. Means, coupled to the memory means for selecting one of the artwork specifications and means for selecting the text elements or other elements of the greeting card are also provided. The apparatus further comprises means, responsive to the memory means and the means for selecting, for manipulating the text or other graphic elements and the artwork specification to automatically generate a greeting card layout in accordance with the plurality of constraints of the artwork specification. The apparatus includes means for displaying the generated greeting card layout.

In accordance with another aspect of the second embodiment of the present invention, a method is provided for automated layout of text elements and artwork on a greeting card. The method comprises the steps of selecting an artwork specification from a plurality of artwork specifications stored in a memory device, each artwork specification comprising information describing a piece of artwork and a plurality of constraints describing the layout of the other elements, such as text or other graphic elements in relation to the piece of artwork, selecting the text elements or other elements such as graphic elements of the greeting card, arranging the text elements or other graphic elements and the artwork specification into a greeting card layout automatically in accordance with the plurality of constraints of the selected artwork specification, and displaying the arranged greeting card layout.

The foregoing and other features, objects and advantages of the invention will be more fully understood by reading the detailed description below in conjunction with the drawings.

BRIEF DESCRIPTION OF THE DRAWINGS

In the drawings:

FIG. 3 is a conceptual illustration of the page specification of the document of FIG. 2 in accordance with the present invention;

FIG. 7 is a conceptual illustration of the artwork specification of the greeting card of FIG. 6 in accordance with the second embodiment of the present invention.

DETAILED DESCRIPTION

Figure 1:
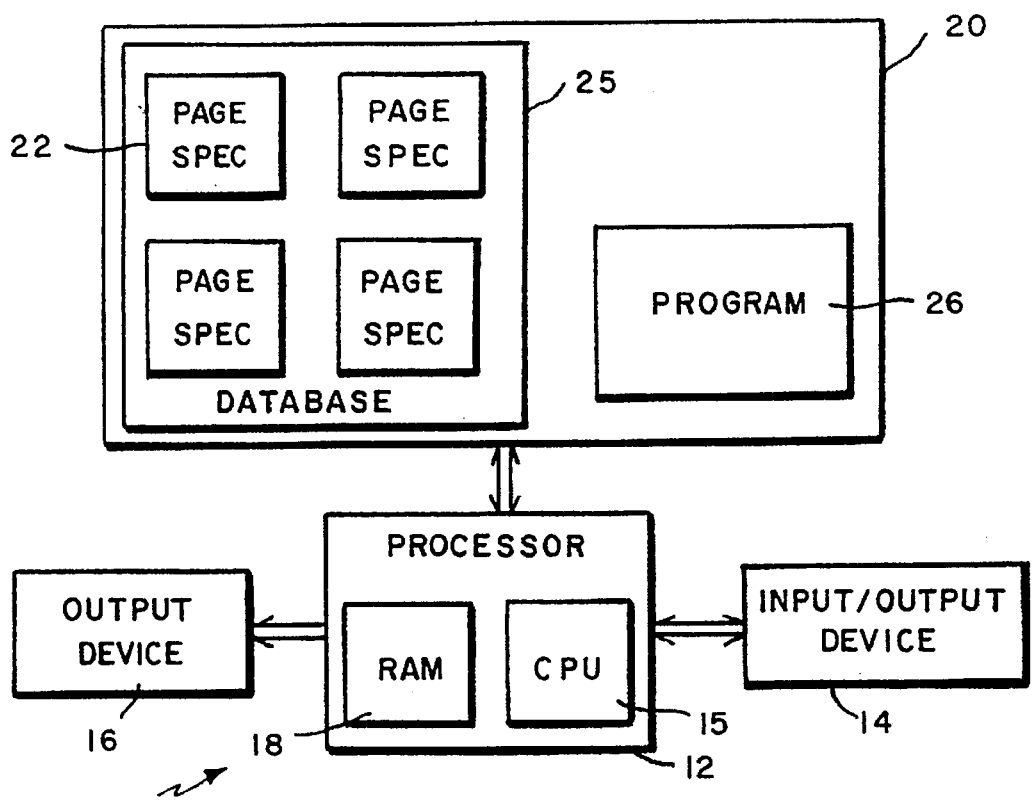
FIG. 1 is a block diagram of an apparatus for automatically generating a page layout according to the present invention.

With reference now to the drawings, and more particularly to FIG. 1 thereof, a system 10 in accordance with the present invention is shown. System 10 is a computer-based system which comprises a digital processor 12 coupled to an input/output device 14, an optional printer 16, and a memory device 20. Digital processor 12 has a central processing unit 15 and a quantity of RAM memory 18 sufficient to execute the operations of the present invention, as explained hereinafter. Any number of commercially available computers are suitable for use as digital processor 12, ranging from microprocessor-based personal computers, to work stations, minicomputers and even main frame computers.

Input/output device 14 is typically a conventional computer terminal having a CRT display and an alphanumeric keyboard, for both sending and receiving data to and from digital processor 12. Output device 16 typically comprises a printer for displaying the results of the generated page layouts according to the present invention. Output device 16 is optional if device 14 is capable of visually displaying the generated page layout, as with most conventional computer terminals.

Digital processor 12 is coupled to a memory 20 through conventional input/output controllers and/or bus structures, depending on the implementation of memory 20. If digital processor 12 includes an adequate amount of on board RAM memory, memory 20 may comprise a ROM memory implemented with an optical disk or ROM cartridge. Alternately, memory 20 may comprise a RAM memory and may be implemented with a magnetic disk, magnetic tape, or a semiconductor memory. It will be obvious to those reasonably skilled in the art that memory 20 may be implemented with a hard disk drive located directly in digital processor 12. It will be further obvious to those reasonably skilled in the art that system 10 may comprise a microprocessor based personal computer which has a keyboard and CRT terminal coupled thereto and contains adequate memory capacity to store the database and program of the present invention, as explained hereinafter.

As indicated in FIG. 1, memory 20 stores a program 26 of proprietary source code, and a database 25 of one or more page specifications. Each page specification generically describes the page layout of a document, such as a business card, wedding invitation or business letterhead.

Each page specification comprises page descriptors, undefined graphic and text elements, and a plurality of constraints relating to the graphic and text elements, and their relationships to one another and the page description.

Figure 2:
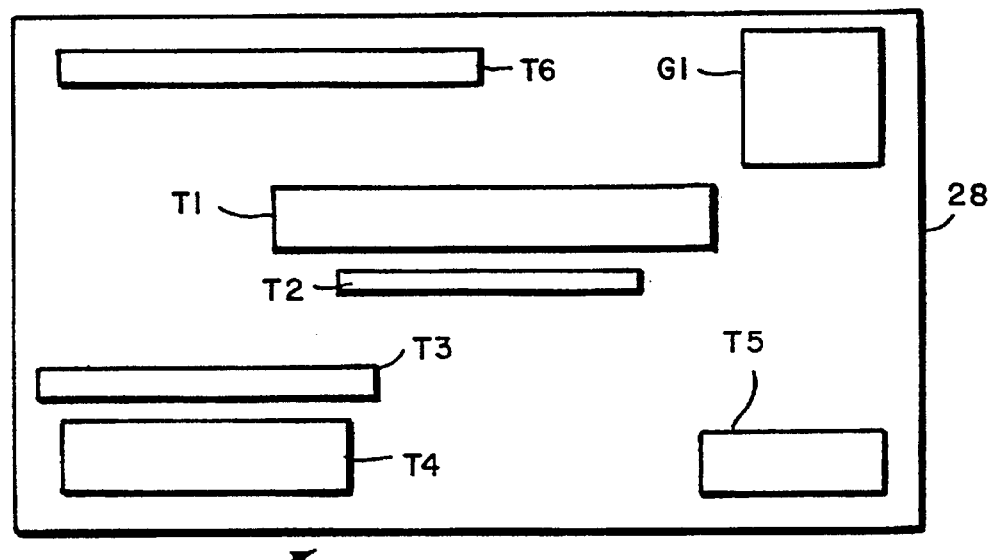
FIG. 2 is a conceptual illustration of a generic document in accordance with the present invention.

For example, page specification 22, shown conceptually in FIGS. 1 and 3, describes a generic document 30, shown conceptually in FIG. 2, which for the purposes of illustration is a business card. Document 30 comprises a page 28 having a default shape of unspecified dimensions. In the illustrative embodiment, page 28 has a landscape format, i.e. the width of the page is greater than the height of the page. Document 30 further includes an undefined graphic element G1 as well as undefined text elements T1–T6.

Referring to FIG. 3, page specification 22, comprises a plurality of data structures representing the text and graphic elements of document 30, as well as a plurality of constraints which dictate the relationships of the graphics and text elements to one another as well as to the page description. Text elements T1–T6 of document 30 are represented in page specification 22 by data structure DS1–DS6, respectively, which have the user-definable attributes of font style, character string, size, and location, as indicated. Graphic element G1 is also represented by a data structure GD1 having the user-definable attributes of location, size, and actual graphic data. A plurality of other data structures, page descriptors PD 1–PD2, within page specification 22 define unchangeable aspects of the page 28. Page specification 22 further comprises a plurality of constraints C1–CN which describe various aspects of page 28 as well as the size and placement of the text and graphic elements of document 30 and their relationship to each other and to page 28.

To illustrate how page specification 22 describes a generic document, consider again document 30 of FIG. 2, the business card. Page 28 represents the actual medium, typically paper, on which the business card is printed. The default shape of page 28 is dictated by the page descriptors in page specification 22 and may or may not be user-definable. As illustrated, page 28 has a landscape format. In document 30, text element T1 30 generically represents the business card holder's name. The text element T2 generically represents the card holder's title. Text element T3 generically represents the business name, while text element T4 generically represents the business address. Text element T5 generically represents the business telephone number. The text element T6 generically represents optional specialty information such as professional services or products produced by the business. A graphic element G1 generically represents optional graphic information such as a corporate logo or other symbols associated with the card holder's business or trade.

Constraints C1–CN of page specification 22 relate to the actual format of page 28 and the way in which text elements T1–T6 and graphic element G1 relate to one another and to page 28. For example, constraint C1 may require that no text or graphic element be located closer than ⅛ inch to the perimeter of page 28. Constraint C2 may require that text element T1, the cardholder's name, be center within page 28. Constraint C3 may require that text element T2, the cardholder's title, has a type size which is not greater than ½ of the type size of the cardholder's name in text element T1. Constraint C4 may require that text element T2, the cardholder's title, be centered beneath text element T1, the cardholder's name. Constraint C5 may require that the type size of text element T3, the business name, be larger than the type size of text element T4, the business address. Constraint C6 may require that text element T5, the business telephone information, be located in the lower left hand corner of page 28. Constraint C7 may require that the first character of text element T6, the specialty information, and the first character of text element T4, the business address be aligned vertically. Constraint C8 may require that graphic element G1, the corporate logo or symbol, if any, be located in the upper right corner of page 28. Numerous other constraints are possible. Still other constraints may define which attributes of the text elements T1–T6 and graphic element G1 are usually definable and what the attribute default values are. Still other constraints may group text or graphic elements into hierarchical structure of derived elements which must be manipulated as single entities.

It will be appreciated by those reasonably skilled in the art that the above-described constraints are for exemplary purposes. The constraints, page descriptors and data structure describing the text elements and graphic elements are not limited to those listed herein and may be structured and defined as desired by the designer of the page specification, typically an experienced graphic designer, to achieve the desired generic document.

Database 25 may contain numerous page specifications, with each specification defining a different generic document. For example, the database may contain several page specifications, each of which generically describes a different business card. By using data structures having default attributes which can be selectively redefined by the user, and a plurality of predefined constraints, a generic page layout is described in each page specification which captures the complex relationships between the graphic and text elements in the page, yet allows the user several degrees of freedom to individually tailor the generic page layout to reflect the desired information.

Referring again to FIG. 1, memory 20 contains a proprietary program 26 which, when executed by digital processor 12, enables the user to interact with the database 25 and automatically generates a page layout, given a selected page specification from database 25 and the information supplied by the user. Program 26 contains conventional user interface subroutines which allow the user to select one of the page specifications in database 25 and to interactively enter user information, such as character strings and a graphic data, into RAM memory associated with the data structures of the selected page specification. Once a page specification is selected and all user-definable data is entered, a number of subroutines in a program 26 compare the user-defined data and corresponding data structures of the selected page specification with the constraints of the page specification. If one or more of the constraints cannot be satisfied, as will typically be the case, with the user-defined data as received, a plurality of subroutines are used to selectively modify various attributes of the user-defined text and graphic elements until substantially all of the constraints of the page specification are met.

Program 26 contains subroutines which, for example, change the type size of a character string in a text element, if the default type size and/or user specified type size is inappropriate to satisfy a particular constraint of the page specification. Program 26 may further contains subroutines for stretching the character string of a text element by changing the length of a character string in a single direction thereby maintaining the string aligned with another reference point while increasing its overall length. Such a subroutine may involve an algorithm which changes the spacing between particular characters of a font style or it may distort the character themselves. Program 26 may contain still other subroutines which scale a specific character string of a text element forcing it to either fill or fit within a given area to comply with a constraint of the page specification.

If the placement of a text or graphic element, as defined by the user or by default attributes, does not satisfy one of the constraints of the selected page specification, program 26 may further include subroutines which change the spacing between text and graphic elements by increasing or decreasing the amount of space between the elements themselves as well as the perimeter of the page. Program 26 may contain further subroutines which change the aspect ratio, i.e. the length to width ratio of the page 28, to conform the user-defined information with the various constraints of the page specification.

It will be obvious to those reasonably skilled in the art that program 26 is not limited to the subroutines described herein and may contain other subroutines which change the size, placement and relationship of the text and graphic elements of the selected page specification in relation to one another as well as the page definition.

It may be appreciated that program 26 has the ability to modify the user defined information in the page specification to optimize the number of constraints which are satisfied. In doing so, the program executes numerous theoretical combinations of changes, depending on the number of constraints and elements within the page specification. In this manner, a user selects a generic page specification and indicates the desired character strings. The computer then executes the redundant iterative trial and error revisions of the text and graphic elements to satisfy the page specification and create a document having a page layout which is aesthetically pleasing to the user.

In one embodiment of the present invention, all constraints in a given page specification are of equal importance. In an alternate embodiment, certain constraints are given higher priority than others within the same page specification. In generating the page layout, the higher priority constraints must be satisfied while the lower priority constraints may or may not be. For example, with the business card of generic document 30, a constraint that the cardholder's name be centered within page 28 would be given a higher priority than a constraint requiring the cardholder's name be located a specific distance from any graphic elements on the page. In this alternate embodiment, the page specification may allow considerable degrees of freedom while still achieving satisfaction of the highest priority constraints in the selected page specification.

Figure 4:
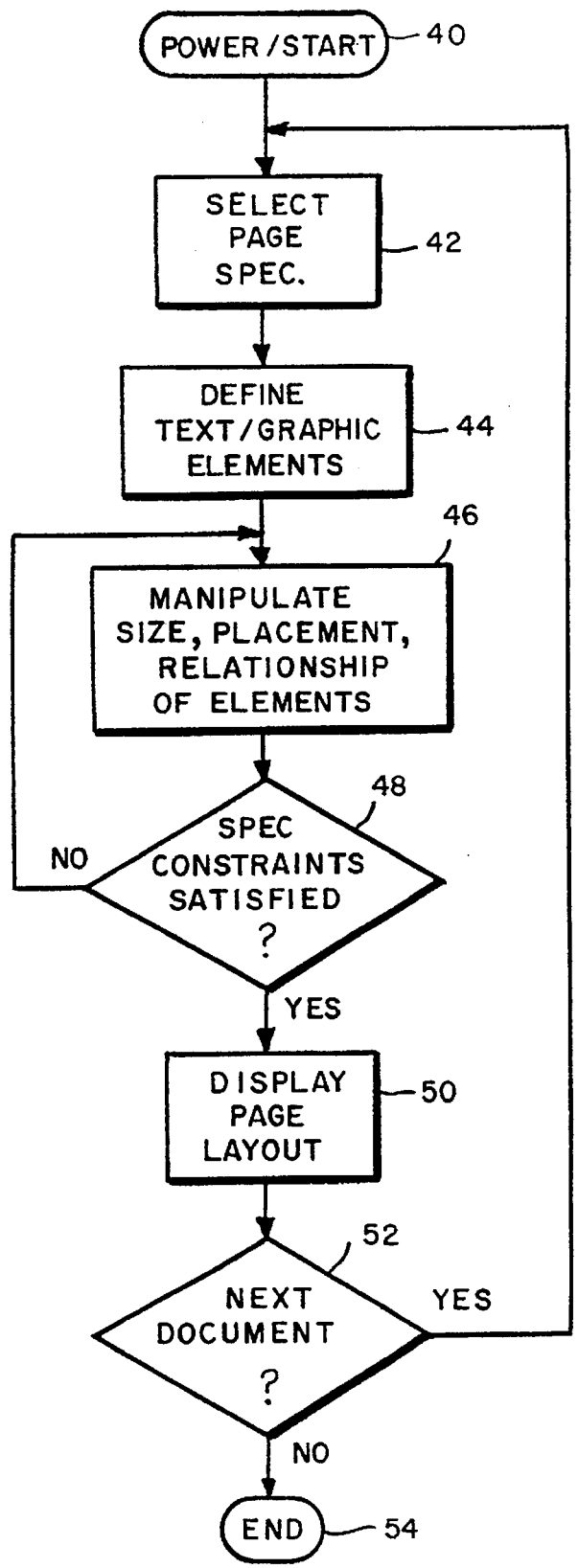
FIG. 4 is a flow chart illustrating the steps of a method for automated layout of a page according to the present invention.

Referring to FIG. 4, a flow chart illustrating the steps of a method for automated layout of a page, according to a second aspect of the present invention, is illustrated. Following power-up and initialization of system 10, as indicated by step 40, the user is prompted and selects one of the page specifications from database 25 in memory 20, as indicated by process step 42. For the purposes of illustration, the selected page specification is assumed to be page specification 22 representing generic document 30, the business card. The program 26 then prompts the user to enter information into RAM memory 18 of processor 12, as indicated in processing step 44.

For example, the user will be prompted to enter the desired dimensions of the page 28, as well as the desired aspect ratio, i.e. portrait or landscape format, if applicable. The user will be further prompted to enter the individual character strings of each of text element T1–T6, as well as the desired font styles, for example Helvetica, Times, Old English, etc., of each text string, if permitted by the constraints of the selected page specification. The user may additionally be able to specify the location and type size of text elements T1–T6. The user may further specify the location of graphic element G1 and provide graphical data which may be either entered directly by the user, with a graphic generating program or which may be previously stored in the system.

Once the user data is entered into the memory, program 26 begins to manipulate the text and graphic elements to satisfy the constraints of the selected page specification, as indicated in process step 46 of FIG. 4. For example, if the user has entered a cardholder name in text element T1 with an abnormally long string of characters, program 26 may reduce the size of the type in order to center the text element within page 28. This, in turn, may require a relocation of text element T2, representing the cardholder's title, in order to satisfy the constraint that the cardholder title be centered beneath the cardholder's name. These changes to text elements T1 and T2 may further require that the spacing or locations of text elements T3, T4, T5 and T6 be changed or relocated with respect to page 28 in order to satisfy other of the constraints within the page specification.

As previously described, the program uses subroutines which scale, stretch and change the size and location of text or graphic data to accommodate the constraints of the specification. After each change to a text or graphic element, the system determines whether all or a majority of the page constraints of the page specification are satisfied, as indicated in decisional step 48. If this condition is not true, further iterations of steps 46 and 48 occur until program 26 determines, in decisional step 48, that all or a substantial majority of constraints are satisfied.

Once program 26 has generated a page 28 which satisfies the constraints of the page specification 22 given the user information, the resulting page layout may be either electronically displayed on input/output device 14 or printed on output device 16, as indicated in process step 50. At this point, the user may choose to create another document using the same method or to end the session, as indicated in decisional step 52. If the user wishes to create another document, the program again queries the user to select a new page specification which is appropriate for the desired document, as indicated in step 42. If the user does not wish to create a new document, the system may be powered down or the session ended, as indicated in step 54.

Figure 5:
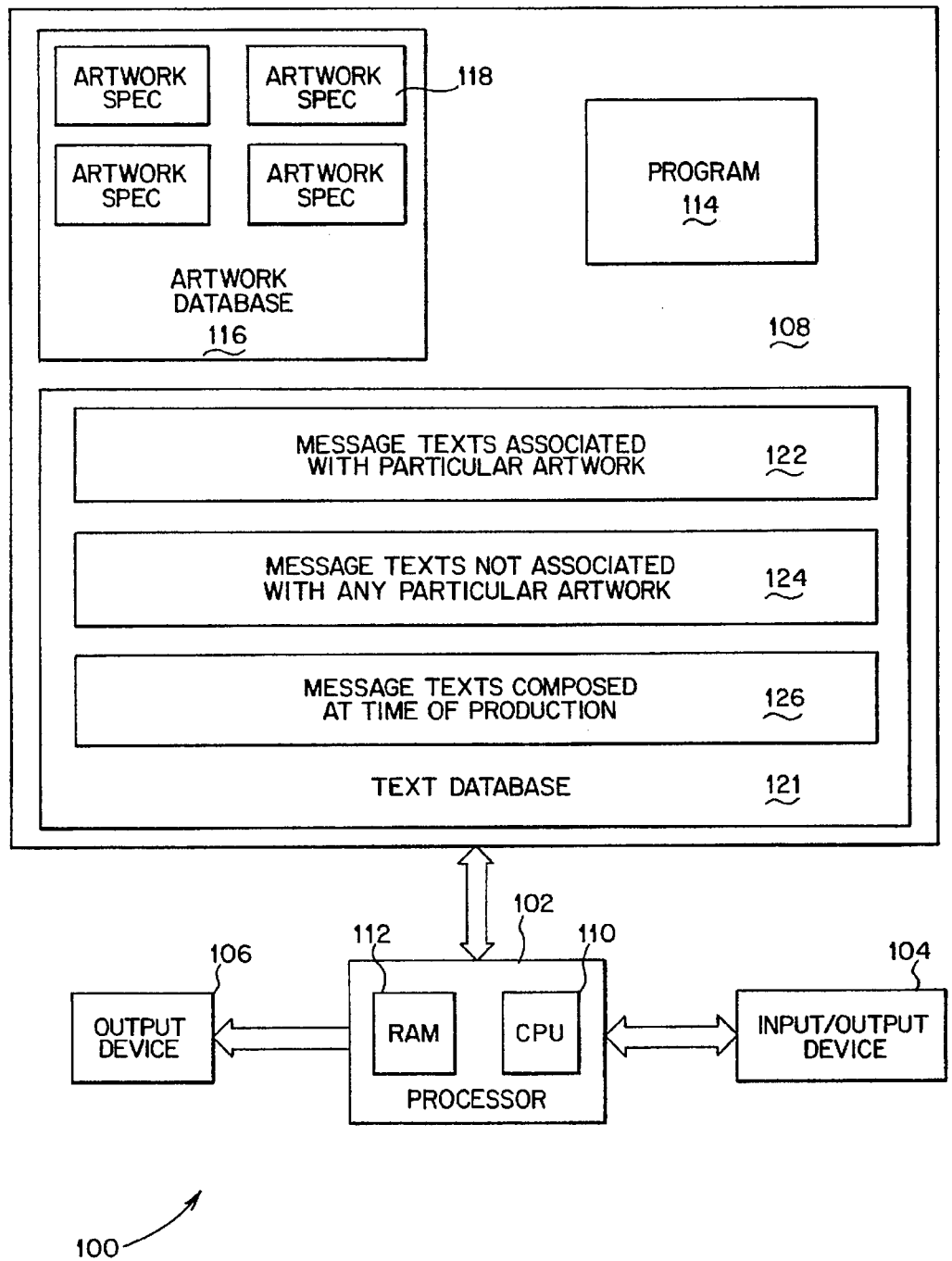
FIG. 5 is a block diagram of an apparatus for automatically generating a greeting card layout in accordance with a second embodiment of the present invention.

FIG. 5 illustrates a system 100 in accordance with a second embodiment of the present invention. System 100, like system 10, is a computer-based system that comprises a digital processor 102 coupled to an input/output device 104, an optional printer 106 and a memory device 108. Digital processor 102 has a central processing unit 110 and a quantity of RAM memory 112 sufficient to execute the operations of the present invention, as explained hereinafter. Any number of commercially available computers are suitable for use as digital processor 102, ranging from microprocessor-based personal computers, to workstations, minicomputers, and even main frame computers.

Input/output device 104 may be the same as and operate in the same manner as input/output device 14. Output device 106 may be the same as and operate in the same manner as output device 16.

Digital processor 102 may be the same as digital processor 12 and operate in the same manner as described in connection with FIG. 1.

As indicated in FIG. 5, memory 108 stores a program 114 of source code. Also included in memory 108 is a first artwork database 116 of one or more artwork specifications 118. As will be explained in greater detail, each artwork specification contains information describing a piece of artwork and a plurality of constraints describing the layout of other elements, such as text or graphic elements in relation to the piece of artwork.

Figure 6:
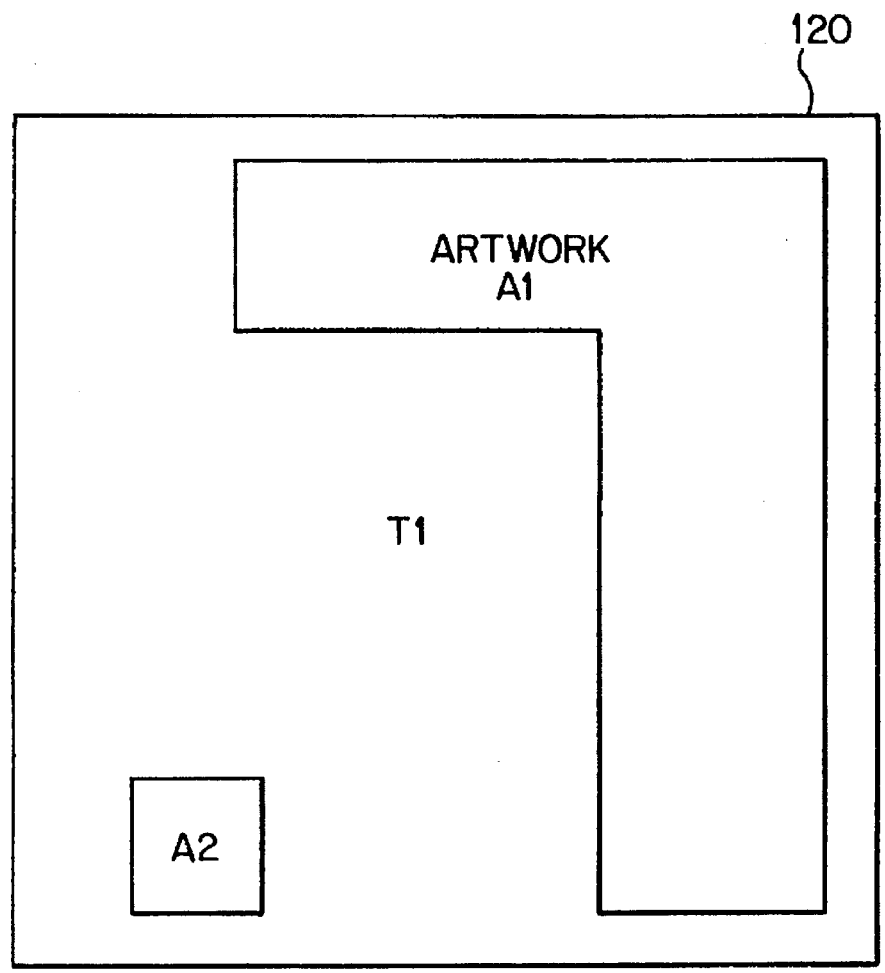
FIG. 6 is a conceptual illustration of a generic greeting card in accordance with the present invention.

For example, artwork specification 118, shown conceptually in FIGS. 5 and 7, describes a particular piece of artwork. FIG. 6 illustrates, conceptually, how the artwork described in artwork specification 118 would be layed out on a greeting card 120. In the illustrated greeting card 120, artwork A1 has an "L" shape and is layed out in a portrait format, i.e., the width of the artwork is less than the height of the artwork. The artwork further includes artwork A2 located in the lower left hand corner of greeting card 120.

Referring to FIG. 7, artwork specification 118 comprises a plurality of data structures representing the graphic elements of the artwork, as well as a plurality of constraints that dictate the relationships of the graphic elements to one another as well as to any text elements or other elements that might be incorporated into greeting card 120. Data structures D1–D2 within artwork specification 118 define unchangeable aspects of the artwork layout. Artwork A1–A2 are represented in artwork specification 118 by data structures AS1–AS2, respectively, which have the attributes of size, location, and actual graphic data describing the artwork itself. Artwork specification 118 further comprises a plurality of constraints C1–Cn that describe various aspects of artwork A1 and A2 that are to be satisfied if an aesthetically pleasing greeting card layout is to be obtained. Constraints C1–Cn of artwork specification 118 describe certain relationships between artwork A1, A2, and any other elements, such as text or graphic elements that may be incorporated into the greeting card as well as any relationships between artwork A1, A2 and the greeting card itself. For example, constraint C1 may require that artwork A1 be located no closer than ⅛ inch to the perimeter of greeting card 120. Constraint C2 may specify the distance between artwork A1 and A2. Constraint C3 may require that any other elements, such as other text or graphic elements be located within area T1 of greeting card 120. Constraint C4 may describe within what range artwork A1 can be increased or decreased in size. Constraint C5 may control the aspect ratio of artwork A1. Constraint C6 may require that artwork A1 or A2 be scaled to fill or fit a designated area of greeting card 120. Constraint C7 may require that artwork A1 and A2 remain in a fixed size relationship to each other. Numerous other constraints on artwork specification 118 are possible. The significant feature is that each artwork specification 118 describes how the other elements, such as text or graphic elements should interact with the placement of the artwork on the greeting card. That is, each artwork specification 118 describes how the other elements of a greeting card are constrained in their placement by the artwork.

It is to be appreciated that a number of artwork specifications using a single piece of artwork may be provided in addition to providing an artwork specification that includes all the constraints associated with a piece of artwork. For example, sets of constraints may be provided that are related to specific greeting card layouts that use the artwork. Each of these specific artwork/constraint sets that form an artwork specification is essentially a subset of the total number of constraints associated with a piece of artwork. Each of these artwork/constraint sets that comprises an artwork specification would then represent an individual greeting card layout.

The artwork specifications in artwork database 116 may be based upon greeting cards having artwork preprinted thereon, a library of artwork that a user may choose from when creating a greeting card, or artwork that is fixed and will be printed on the card in a specified layout at the time the greeting card is produced. The art that will be printed may range from a simple pre-defined image (for example, a scanned image or some line art) to a higher representation of an image in terms of other elements, in which case these sub-elements may be either treated together as a single entity in the artwork specification or as a number of constrained entities for purposes of the greeting card layout.

Memory 108 contains another database 121 that contains a number of elements, such as text or other graphic elements that can be selected by the user for combination with a selected artwork specification to create a greeting card. In the particular embodiment illustrated in FIG. 5, database 121 is a text database that contains three databases 122, 124, and 126. Although a text database is illustrated in FIG. 5, one skilled in the art will appreciate that other elements, such as graphic elements, can be stored in a database for use in creating a greeting card.

A message text is selected from one of databases 122, 124, or 126 to be inserted, for example, in location T1 of greeting card 120 illustrated in FIG. 6. Database 122 contains a plurality of message texts that are associated with a particular artwork specification. An example of this type of message is a joke that depends upon the artwork to tell part of the story. Database 124 contains a plurality of pre-written message texts that are not associated with any particular type of artwork. An example of this type of message is a generic holiday greeting or famous quotations. Database 126 contains message texts that are composed at the time of greeting card production by the user or by an on-line text generation program, such as that described in U.S. Pat. No. 4,712,174. These message texts may be stored for future use in database 126.

The selected message text is entered into data structure DS1 of artwork specification 118 along with the desired font style, type size and location.

Referring again to FIG. 5, memory 108 contains a program 114 that operates in a manner similar to the FIG. 1 embodiment. In the same manner, the constraints on a given artwork specification can have equal importance or differing priorities.

FIG. 7 is a flow chart illustrating the steps of a method for automated layout of a greeting card according to the second embodiment of the present invention. Following power-up and initialization of system 100, as indicated by step 150, the user is prompted and selects one of the artwork specifications from artwork database 116 in memory 108, as indicated by process step 152. For the purposes of illustration, the selected artwork specification is assumed to be artwork specification 118 representing the layout of greeting card 120.

From step 152, the system proceeds to step 154 in which the user is prompted to select a message text from databases 122, 124, or 126. The selected message text is inserted into data structure DS1. The user will be further prompted to specify the font style, type size, and location of the message text.

Figure 8:
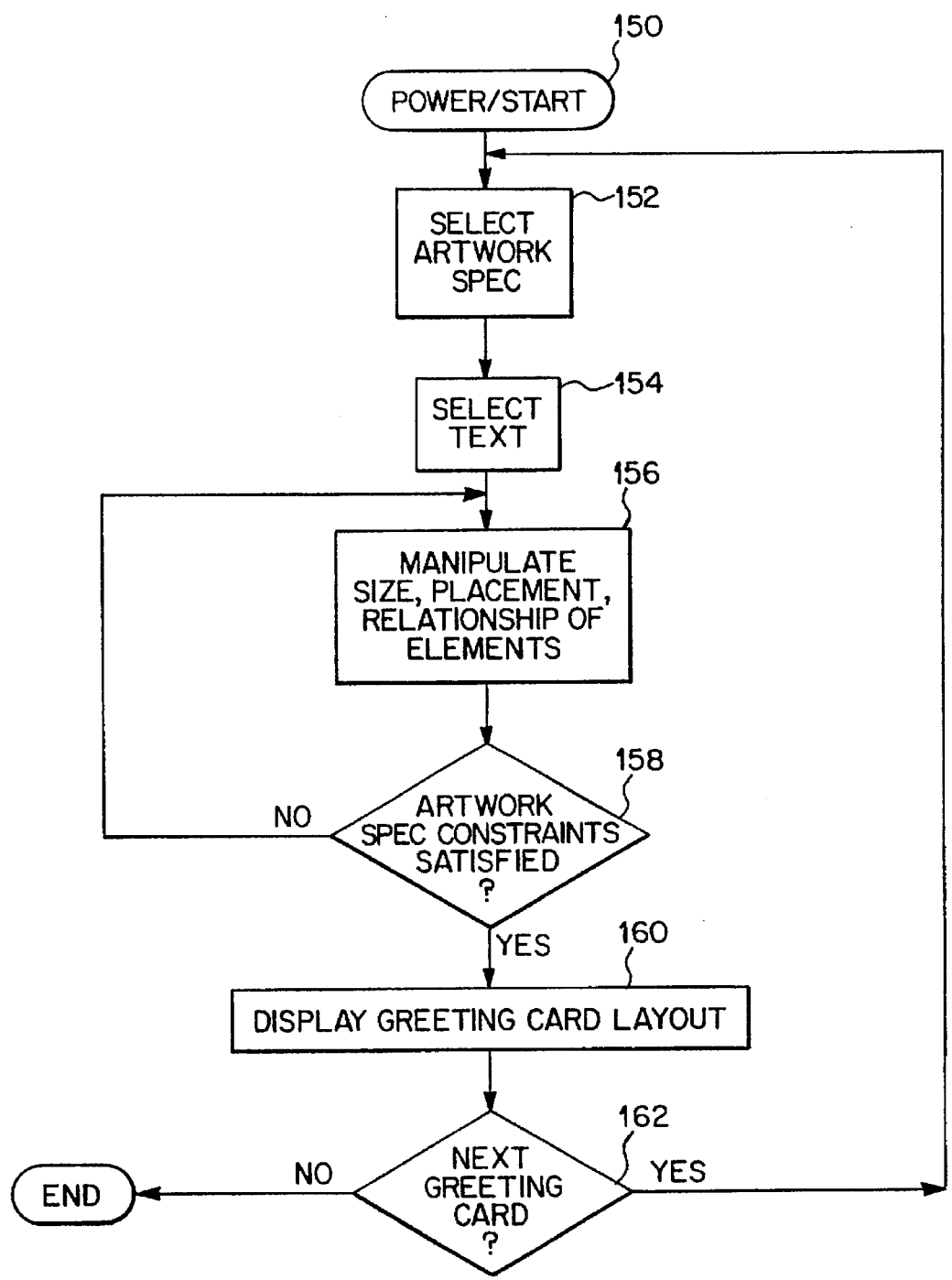
FIG. 8 is a flow chart illustrating the steps of a method for automated layout of a greeting card according to the second embodiment of the present invention.

Once the artwork specification and the text have been selected, program 114 begins to manipulate the text and artwork to satisfy the constraints of the selected artwork specification, as indicated in process step 156 of FIG. 8. As described in connection with FIGS. 1–4, the program uses subroutines which scale, stretch, and change the size and location of text or artwork data to accommodate the constraints of the artwork specification. After each change to a text or graphic element, the system determines whether all or a majority of the constraints of the artwork specification are satisfied, as indicated in decisional step 158. If the condition is not true, further iterations of steps 156 and 158 occur until program 114 determines, in decisional step 158, that all or a substantial majority of constraints are satisfied.

Once program 114 has generated a greeting card that satisfies the constraints of the artwork specification 118, the resulting greeting card layout may be either electronically displayed on input/output device 104 or printed on output device 106, as indicated in process step 160. If the user wishes to create another greeting card, the program again queries the user to select a new artwork specification as indicated in process step 162. If the user does not wish to create a new greeting card, the system may be powered-down or the session ended, as indicated in step 164.

It will be appreciated that this second embodiment of the present invention allows background artwork and a message text to be combined at the time of production of a greeting card without the need for an explicit layout for each text/artwork combination. That is, the second embodiment of the present invention does not require that for each piece of artwork there is a predetermined explicit layout for every message text that might be combined with the piece of artwork and incorporated into a greeting card. The second embodiment of the present invention thus avoids the requirement that the system store an artwork/message text layout for each possible combination of artwork from database 116 and message from text database 121. Instead, the present invention manipulates the text in accordance with the constraints associated with the artwork to more generally layout information on the greeting card, rather than having a specific layout associated with each message text/artwork combination.

The present invention is thus capable of combining a general library of artwork with a general (and user extendable) library of messages to create professional quality greeting cards without the need for a specific layout for each combination of artwork and message. Thus, the present invention, in the second embodiment, allows the user to select a message from a large library of messages and controls the layout of the greeting card in a way that allows the greeting card to be layed out in an aesthetically pleasing manner.

It will be appreciated from the foregoing, that the method and apparatus of the present invention provides a user with relative degrees of freedom in creating a document while simultaneously freeing the user from making countless revisions to the page layout of a document. Such a system and method are particularly well suited for applications in which generic documents containing individualized information are desired, for example, greeting cards, diplomas, certificates, business cards, wedding invitations, menus, printed advertisements, English language versions of foreign advertisements, forms etc. As such, the present invention allows a user to select a generically described document and, with numerous degrees of freedom, tailor the generic documents to the desired page layout.

Accordingly, it will be appreciated that the detailed disclosure has been presented by way of example only and is not intended to be limiting. Various alternatives, modifications and improvements will readily occur to those skilled in the art, and may be practiced without departing from the spirit and scope of the invention. The invention is limited only as required by the following claims and equivalents thereto.

What is claimed is:

1. An apparatus for automatically generating a layout of text elements and artwork on a greeting card in response to action by a user, the apparatus comprising:

a. memory means for storing a plurality of artwork specifications, each artwork specification comprising user-defined information describing a piece of artwork and a plurality of constraints describing the layout of text elements in relation to the piece of artwork;

b. first means, coupled to the memory means, for selecting one of the artwork specifications;

c. second means for selecting, by the user, the text elements of the greeting card; and d. means, responsive to the first means and second means, for manipulating the text elements and the artwork specification to automatically generate a greeting card layout in accordance with the plurality of constraints of the selected artwork specification, wherein when the plurality of constraints cannot be simultaneously satisfied, at least one of the information describing a piece of artwork and the text elements are modified automatically to be respectively different from the user-defined information previously stored and the text elements as selected by the user; and e. means for displaying the generated page layout.

2. The apparatus of claim 1 wherein the means for displaying comprises a video display device.

3. The apparatus of claim 1 wherein the means for displaying comprises a printer.

4. The apparatus of claim 1 wherein the plurality of constraints comprises:

at least one constraint on size of a text element relative to the piece of artwork and to the greeting card.

5. The apparatus of claim 1 wherein the plurality of constraints comprises:

at least one constraint on placement of a text element relative to the piece of artwork and to the greeting card.

6. The apparatus of claim 1 wherein the plurality of constraints comprises:

at least one scaling constraint requiring a text element to fill or fit a designated area of the greeting card.

7. The apparatus of claim 1 wherein the plurality of constraints comprises a constraint on aspect ratio of the greeting card.

8. The apparatus of claim 1 wherein the means for manipulating comprises means for scaling size of a text element in accordance with one of the plurality of constraints of the selected artwork or specifications when the plurality of constraints cannot be simultaneously satisfied.

9. The apparatus of claim 1 wherein the means for manipulating comprises means for changing spacing between text elements and graphic elements in accordance with one of the plurality of constraints of the selected artwork specification when the plurality of constraints cannot be simultaneously satisfied.

10. The apparatus of claim 1 wherein the means for manipulating comprises means for changing line breaks in user-defined character strings of a text element of the selected artwork specification when the plurality of constraints cannot be simultaneously satisfied.

11. The apparatus of claim 1 wherein the means for manipulating comprises means for stretching a user-defined character string of a text element by changing length of the user defined character string in a single direction when the plurality of constraints cannot be simultaneously satisfied.

12. The apparatus of claim 1 wherein the means for manipulating comprises means for scaling size of the piece of artwork in accordance with one of the plurality of constraints of the selected artwork specification when the plurality of constraints cannot be simultaneously satisfied.

13. The apparatus of claim 1 wherein the means for manipulating comprises means, when the plurality of constraints cannot be simultaneously satisfied, for selecting at least one of the plurality of constraints to not be satisfied.

14. A method for automated layout of text elements and artwork on a greeting card in response to action by a user, the method comprising the steps of:
   a. selecting an artwork specification from a plurality of artwork specifications stored in a memory device, each artwork specification comprising user-defined information describing a piece of artwork and a plurality of constraints describing the layout of text elements in relating to the piece of artwork;
   b. selecting, by the user, the text elements of the greeting card;
   c. arranging the text elements and artwork specification into a greeting card layout automatically in accordance with the plurality of constraints of the selected artwork specification, wherein when the plurality of constraints cannot be simultaneously satisfied, at least one of the information describing a piece of artwork and the text elements are modified automatically to be respectively different from the user-defined information previously stored and the text elements as selected by the user; and
   d. displaying the arranged greeting card layout.

15. The method of claim 14 wherein the step (a) of selecting further comprises the steps of:
   defining the plurality of constraints; and
   storing the plurality of constraints in a memory device.

16. The method of claim 14 wherein the step (a) of selecting includes selecting a constraint on size of a text element relative to the piece of artwork and to the greeting card.

17. The method of claim 14 wherein the step (a) of selecting includes selecting a constraint on placement of a text element relative to the piece of artwork and to the greeting card.

18. The method of claim 14 wherein the step (a) of selecting includes selecting at least one scaling constraint requiring a text element to fill or fit a designated area of the greeting card.

19. The method of claim 14 wherein the step (a) of selecting includes selecting a constraint on aspect ratio of the greeting card.

20. The method of claim 14 wherein the step (b) of selecting includes the further steps of:
   defining size of the greeting card; and
   defining aspect ratio of the greeting card.

21. The method of claim 14 wherein the step (b) of selecting includes selecting a font style of a text element.

22. The method of claim 14 wherein the step (b) of selecting includes defining character strings of a text element.

23. The method of claim 14 wherein the step (a) of selecting includes defining graphic data of the piece of artwork.

24. The method of claim 14 wherein the step (c) of arranging includes scaling size of a text element in accordance with at least one but not all of the plurality of constraints of the selected artwork specifications when all of the plurality of constraints cannot be simultaneously satisfied.

25. The method of claim 14 wherein the step (c) of arranging includes scaling size of a text element in accordance with the plurality of constraints of the selected artwork specifications when the plurality of constraints cannot be simultaneously satisfied.

26. The method of claim 14 wherein the step (c) of arranging includes changing spacing between a text element and the piece of artwork in accordance with the plurality of constraints of the selected artwork specification when the plurality of constraints cannot be simultaneously satisfied.

27. The method of claim 14 wherein the step (c) of arranging includes changing line breaks in character strings in a text element when the plurality of constraints cannot be simultaneously satisfied.

28. The method of claim 14 wherein the step (c) of arranging includes stretching a character string of at least one text element by changing lengths of the character string in a single direction when the plurality of constraints cannot be simultaneously satisfied.

29. The method of claim 14 wherein the step (d) of displaying includes the step of displaying the greeting card electronically on a display device.

30. The method of claim 14 wherein the step (c) of arranging includes manipulating text elements and artwork specification so that at least one of plurality of constraints is complied with exactly.

31. The method of claim 14 wherein the step (c) of arranging includes the step of arranging the plurality of constraints into a hierarchical arrangement in which some constraints have a higher priority than others and wherein higher priority constraints are satisfied.

32. An apparatus for automatically generating a layout of a plurality of text elements and graphic elements on a page, the apparatus comprising:
   a. memory means for storing a plurality of page specifications, each page specification comprising a plurality of prioritized and weighted constraints describing the layout of user-definable text elements and graphic elements on a output medium;
   b. means, coupled to said memory means, for selecting one of said page specifications;
   c. receiving means for receiving and storing user-defined character strings defining said user-definable text elements of said one page specification and user-defined graphic data defining said user definable graphic elements of said one page specification, the user-definable text elements and graphic elements having attributes;
   d. means, responsive to said memory means and said receiving means, for manipulating said plurality of text elements and said plurality of graphic elements of said one page specification to automatically generate a page layout in accordance with the prioritization and weighting of the plurality of prioritized and weighted constraints of said one page specification, wherein when the plurality of prioritized and weighted constraints cannot be simultaneously satisfied, the attributes are modified automatically to be different from the attributes as defined by the receiving means; and
   e. means for displaying the generated page layout.

33. A software product for providing information and instructions to a general purpose computer, comprising:
   an electronic memory medium for providing information to the general purpose computer, said electronic memory medium having stored thereon a plurality of page specifications, each of said page specifications comprising a plurality of prioritized and weighted constraints describing a layout of user-defined text elements and graphic elements on an output medium, said user-defined text elements and graphic elements described by data structures on the electronic memory medium;
   said electronic memory medium further storing a program for providing to a general purpose computer instructions necessary for manipulating said user-definable text elements and graphic elements of said page specification in accordance with the plurality of prioritized and weighted constraints of said page specification;

said electronic memory medium further storing a program for providing to the general purpose computer instructions necessary for, when the plurality of prioritized and weighted constraints cannot be simultaneously satisfied, automatically modifying the data structures.

34. A software product for providing information and instructions to a general purpose computer, comprising:

an electronic memory medium for providing information to a general purpose computer, said electronic memory medium having stored thereon a plurality of artwork specifications, each artwork specification comprising user-defined information describing a piece of artwork and a plurality of constraints describing layout of text elements in relation to the piece of artwork, said plurality of artwork specifications described by data structures on the electronic memory medium;

said electronic memory medium further storing a program for providing to a general purpose computer instructions necessary for selecting one of the artwork specifications, selecting text elements of a greeting card in response to user action, and manipulating the text elements and the artwork specification to automatically generate a greeting card layout in accordance with the plurality of constraints of the selected artwork specification; and said electronic memory medium further storing a program for providing to a general purpose computer instructions necessary for automatically modifying at least one of the information describing a piece of artwork and the selected text elements to be respectively different from the user-defined information previously stored and the text elements selected by the user when the plurality of constraints cannot be simultaneously satisfied.

35. A method for automated layout of text elements and graphic elements on a page, comprising the steps of:

a. selecting one of a plurality of page specifications stored in a memory device, each page specification comprising a plurality of prioritized and weighted constraints describing the layout of user-definable text elements and graphic elements on a page;

b. defining said user-definable text elements and graphic elements, the user-definable text elements and graphic elements having attributes;

c. arranging said text elements and graphic elements into a page layout automatically according to said plurality of prioritized and weighted constraints, wherein when the plurality of prioritized and weighted constraints cannot be simultaneously satisfied, the attributes are modified automatically to be different from the attributes as defined in the defining step (b); and d. displaying the page layout arranged in step (c).

36. The method of claim 35 wherein step (a) further comprises the further steps of:

defining said plurality of prioritized and weighted constraints; and storing said plurality of prioritized and weighted constraints in a memory device.

37. The method of claim 35 wherein said plurality of prioritized and weighted constraints comprises:

a constraint on the size of one of the plurality of elements relative to others of said plurality of elements and to the page.

38. The method of claim 35 wherein said plurality of prioritized and weighted constraints comprises:

a constraint on the placement of one of the plurality of elements relative to others of said plurality of elements and to the page.

39. The method of claim 35 wherein said plurality of prioritized and weighted constraints comprises:

at least one scaling constraint requiring one of the plurality of elements to fill or fit a designated area of the page.

40. The method of claim 35 wherein said plurality of prioritized and weighted constraints comprises:

a constraint on the aspect ratio of the page.

41. The method of claim 35 wherein step (b) comprises the further steps of:

defining the size of the page; and defining the aspect ratio of the page.

42. The method of claim 35 wherein step (b) further comprises the step of:

selecting a font style for one of the text elements of the page specification.

43. The method of claim 35 wherein step (b) comprises:

defining the character strings of the text elements of the page specification.

44. The method of claim 35 wherein step (b) comprises:

defining the graphic data of the graphic elements of the page specification.

45. The method of claim 35 wherein step (c) comprises the step of:

scaling the size of one of the text elements and graphic elements in accordance with said plurality of constraints of said selected page specification when the plurality of prioritized and weighted constraints cannot be simultaneously satisfied.

46. The method of claim 35 wherein step (c) comprises the step of:

changing the spacing between ones of the text elements and graphic elements in accordance with said plurality of constraints of said selected page specification when the plurality of prioritized and weighted constraints cannot be simultaneously satisfied.

47. The method of claim 35 wherein step (c) comprises the step of:

changing the line breaks in the character strings of one of the text elements defined in step (b) when the plurality of prioritized and weighted constraints cannot be simultaneously satisfied.

48. The method of claim 35 wherein step (c) comprises:

stretching the character string of at least one text element defined in step (b) by changing the lengths of the character strings in a single direction when the plurality of prioritized and weighted constraints cannot be simultaneously satisfied.

49. The method of claim 35 wherein step (d) comprises:

displaying the page layout of step (c) electronically on a display device.

50. The method of claim 35 wherein step (d) comprises:

printing the page layout of step (c) on a printer.

51. The method of claim 35 wherein step (c) comprises:

manipulating said text elements and graphic elements so that at least one of said plurality of prioritized and weighted constraints is complied with exactly.

52. The method of claim 35 wherein said plurality of prioritized and weighted constraints have a hierarchical arrangement in which some of said plurality of prioritized and weighted constraints have a higher priority than other of said plurality of prioritized and weighted constraints and wherein the higher priority constraints are satisfied in step (c).

53. The method of claim 35 wherein said plurality of constraints comprises:

at least one constraint which arranges ones of said text elements and graphic elements into a hierarchical structure which is manipulated as a single entity.

54. The apparatus of claim 32 wherein said means for displaying comprises a video display device.

55. The apparatus of claim 32 wherein said means for displaying comprises a printer.

56. The apparatus of claim 32 wherein said plurality of constraints comprises:

at least one constraint on the size of one of the plurality of elements relative to others of said plurality of elements and to the page.

57. The apparatus of claim 32 wherein said plurality of constraints comprises:

at least one constraint on the placement of one of the plurality of elements relative to other of said plurality of elements and to the page.

58. The apparatus of claim 32 wherein said plurality of constraints comprises:

at least one scaling constraint requiring one of the plurality of elements to fill or fit a designated area of the page.

59. The apparatus of claim 32 wherein said plurality of constraints comprises:

a constraint on the aspect ratio of the page.

60. The apparatus of claim 32 wherein said means for manipulating comprises:

means for scaling the size of one of the text elements in accordance with one of said constraints of said one page specification when the plurality of prioritized and weighted constraints cannot be simultaneously satisfied.

61. The apparatus of claim 32 wherein said means for manipulating comprises:

means for changing the spacing between the text elements and graphic elements in accordance with one of said of constraints of said one page specification when the plurality of prioritized and weighted constraints cannot be simultaneously satisfied.

62. The apparatus of claim 32 wherein said means for manipulating comprises:

means for changing the line breaks in the user-defined character strings of a text element of said one page specification when the plurality of prioritized and weighted constraints cannot be simultaneously satisfied.

63. The apparatus of claim 32 wherein said means for manipulating comprises:

means for stretching a user-defined character string of a text element by changing the length of the character string in a single direction when the plurality of prioritized and weighted constraints cannot be simultaneously satisfied.

64. The apparatus of claim 32 wherein said means for storing is a ROM memory device.

65. The apparatus of claim 32 wherein said means for manipulating comprises:

means for scaling the size of one of the graphic elements in accordance with one of said constraints of said one page specification when the plurality of prioritized and weighted constraints cannot be simultaneously satisfied.

66. The method of claim 14 wherein the step (a) of selecting includes selecting a constraint on placement of a text element relative to the piece of artwork and to the greeting card.

67. The method of claim 14 wherein the step (d) of displaying includes the step of displaying the greeting card electronically on a display device.

* * * * *